Patented Sept. 18, 1934

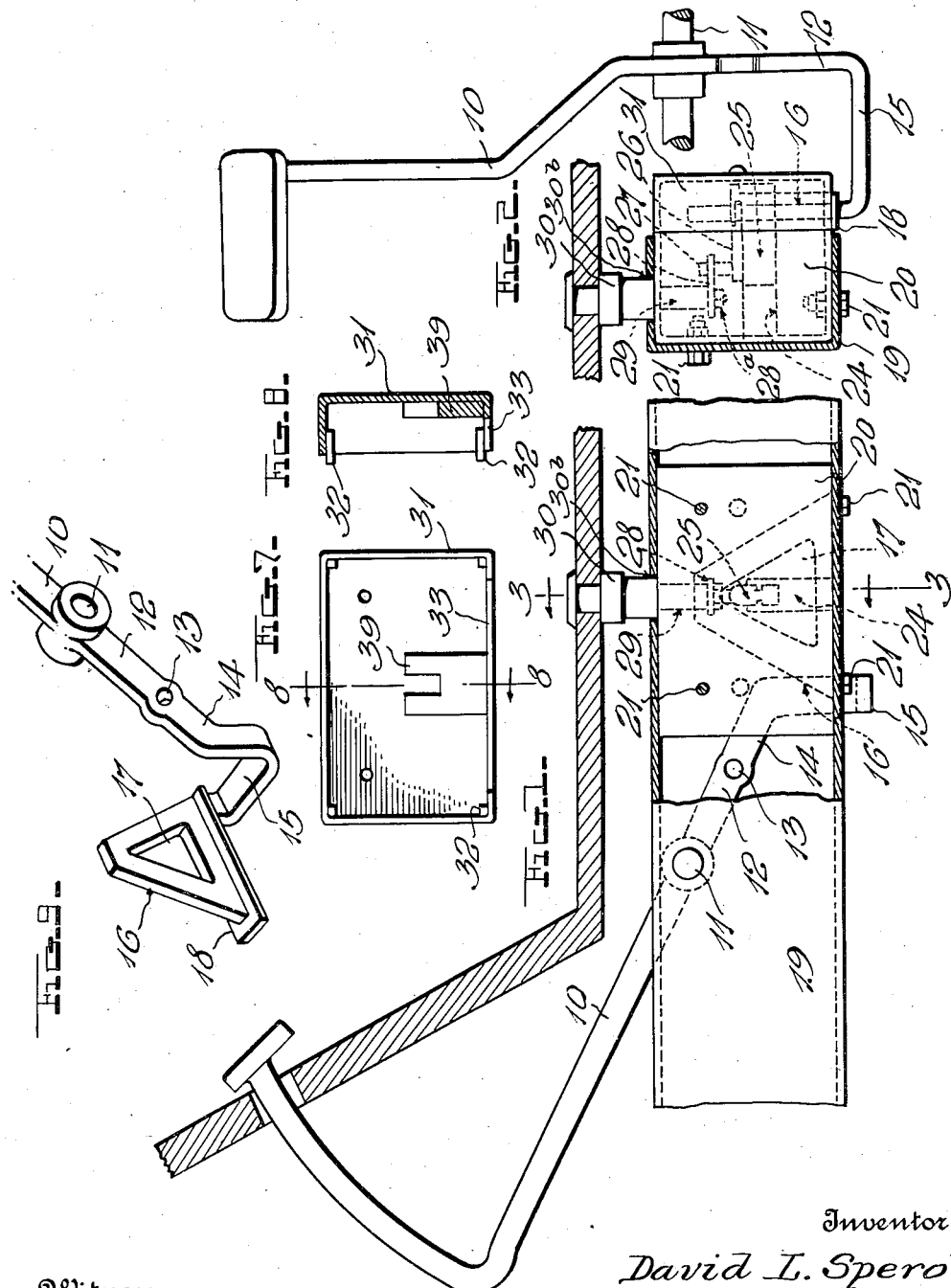

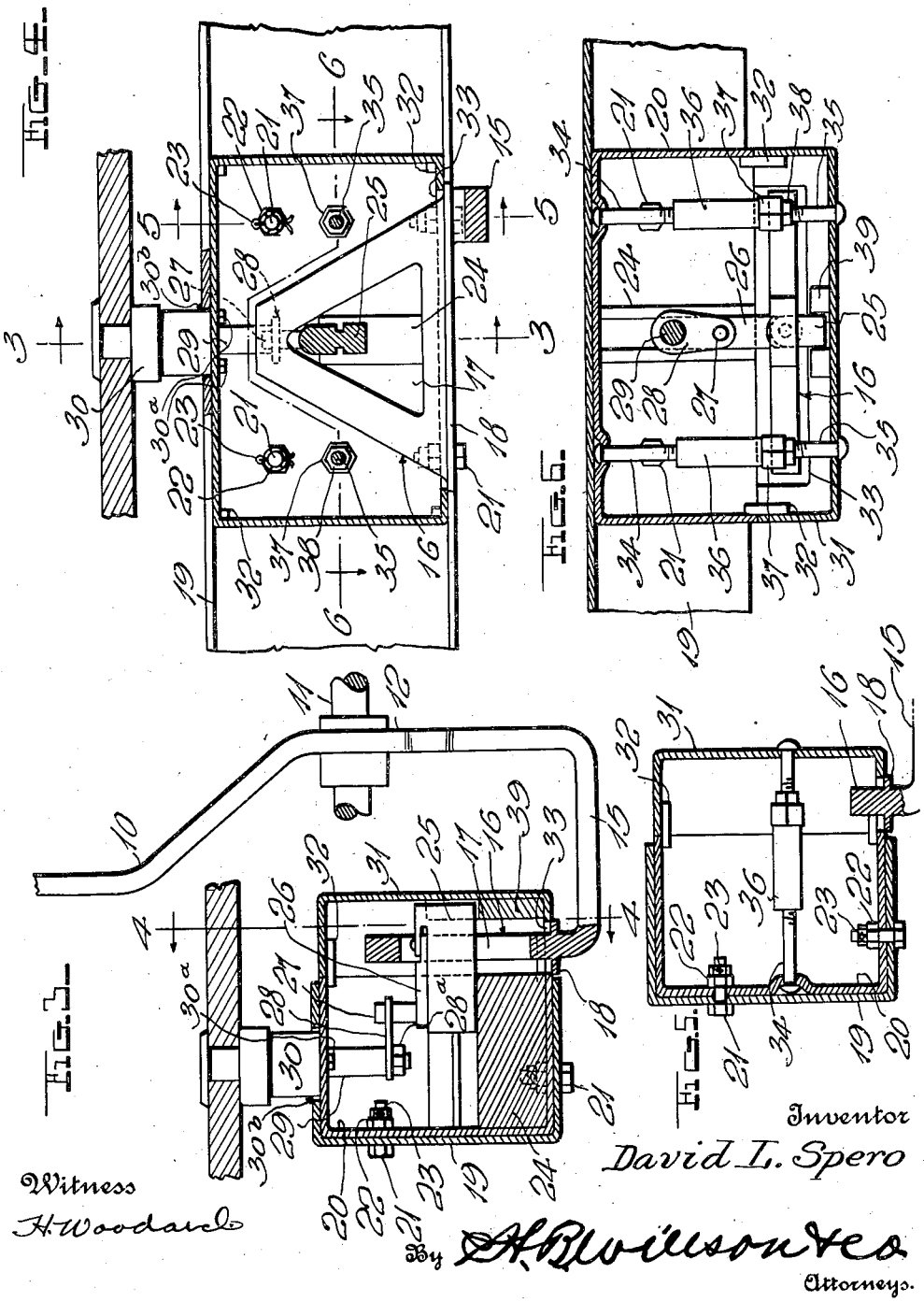

1,974,198

UNITED STATES PATENT OFFICE 1,974,198

AUTOMOBILE CLUTCH PEDAL LOCK

David L. Spero, San Antonio, Tex., assignor of one-fourth to Joe Obriotti, San Antonio, Tex.

Application February 6, 1934, Serial No. 710,033

10 Claims. (Cl. 70—128)

The invention aims primarily to provide a simple and efficient device for locking an automobile clutch pedal in clutch-out position, preventing unauthorized driving of the car and thus, to a large extent, preventing theft.

The device includes a fixedly mounted casing provided with a cover and having an opening which receives an extension on the clutch pedal when the latter is in clutch-out position, and lock-controlled means within said casing for locking said extension; and further objects are to provide securing means for said casing readily releasable only from the interior thereof, and securing means for said cover accessible for release only through the aforesaid opening. This opening is completely closed by part of the clutch pedal extension when said pedal is locked in clutch-out position and there is thus little possibility of breaking into the casing or breaking the latter loose from the car frame in an attempt to steal the machine. Moreover, all parts are preferably hardened to prevent cutting thereof by hacksaw or cold chisel.

With the foregoing in view, the invention resides in the novel subject matter hereinafter described and claimed, description being accomplished by reference to the accompanying drawings.

Fig. 1 is a vertical longitudinal sectional view, partly in elevation, showing the invention applied.

Fig. 2 is an end elevation showing the chassis frame and floor board in section.

Fig. 3 is a vertical transverse sectional view on line 3—3 of Fig. 1.

Fig. 4 is a vertical longitudinal sectional view on line 4—4 of Fig. 3.

Fig. 5 is a vertical transverse sectional view on line 5—5 of Fig. 4.

Fig. 6 is a horizontal sectional view on line 6—6 of Fig. 4.

Fig. 7 is an inner side elevation of the casing cover.

Fig. 8 is a transverse sectional view on line 8—8 of Fig. 7.

Fig. 9 is a perspective view showing a portion of the clutch pedal and its lock-engaging extension.

The numeral 10 denotes a conventional clutch pedal fulcrumed at 11 and provided with an arm 12 projecting below the fulcrum, said arm being formed with the usual opening 13 for connection of a clutch throw-out link or the like therewith. Whereas the usual clutch pedal terminates immediately below the opening 13, I provide said pedal with an extension. Part of this extension is in the form of an integral continuation of the arm 12, as denoted at 14. Projecting laterally from the lower end of this arm continuation, is a lateral arm 15, and integral with this arm 15, is an upstanding lock-engaging member 16. This member is preferably of triangular form as shown and is provided with an opening 17 through which a locking bolt hereinafter described is intended to project. At the base of the member 16, the latter is provided with an integral flange 18 for a purpose to appear. The arm extension 14 may be welded onto the conventional clutch pedal or the pedal plus the improvements may be forged in one piece. In either case, such hardening will be effected as to prevent cutting with hack-saw or cold chisel.

Fixedly mounted on the car frame, preferably within the channel of one of the chassis bars 19, is a heavy, hardened metal casing 20 of rectangular form and provided with one open side. The casing is secured to the chassis bar 10 by hardened bolts 21 whose nuts 22 are within the casing, said nuts being preferably of castellated form and locked by cotter pins 23. Fixedly mounted within the casing 20, is a transverse bolt guide 24 which is preferably located centrally between the ends of said casing. A bolt 25 is slidably engaged with the guide 24 and is adapted for projection beyond the open side of the casing 20. In the present showing, a link 26 is pivoted to the upper side of the bolt 25 and is provided with an upstanding pin 27 received rotatably in an opening in an arm 28, said arm being detachably secured by a nut 28ª and lock washer to the lower end of a shaft 29. Locking means 30 is provided for the shaft 29 and when said locking means is released by insertion of the proper key, turning of this key will rotate said shaft 29 to project or retract the bolt as required. The locking means 30 is detachably secured at 30ª (Fig. 4) to the casing 20. This, and the detachability of arm 28, allow entire disconnection of the lock from the casing, securing of this casing in the channel of the chassis bar 19, insertion of the locking means 30 through the hole 30ᵇ in said bar, and re-connection of the locking means with the casing 20 and bolt 25.

A rectangular cover 31 is provided for the casing 20, said cover having an open side disposed toward the open side of said casing. The cover 31 is hardened and is secured tightly against the casing, said cover being preferably provided with projecting studs 32 at its corners, snugly received in corresponding corners of the casing. The lower wall of the cover 31 is formed with a longitudinal slot 33 through which the lock-engaging member 16 of the pedal 10 may enter the casing to be engaged by the bolt 25, when the latter is projected as seen in Figs. 3 and 6.

Securing means are provided for the cover 31, said securing means being preferably in the nature of turn-buckles. In the present showing, each of these turn-buckles comprises one threaded stud 34 fixedly carried by the longitudinal side wall of the casing 20, another threaded stud 35 carried by the opposed side wall of the cover 31, and a connecting sleeve 36 threaded onto the two studs, said sleeve 36 having a wrench-engaging portion 37. A lock-nut 38 for the sleeve 36 is threaded on the stud 35. The two turn-buckles are confined within the cover-equipped casing and the portions 37 and 38 thereof are accessible only through the slot 33. After securing the casing 20 in place, the cover 31 is applied and this cover is so positioned by the projecting studs 32 that the mating portions of the turn-buckles will be accurately alined with each other. Thus, by working through the slot 33 with a suitable wrench, both turn-buckles may be engaged, tightened and locked to securely fasten the cover 31 to the casing 20. The securing means 21, 22, 23 for this casing 20 cannot be released without gaining access to the interior of said casing, said interior cannot be reached without removing the cover 31, the securing means for this cover can only be released by working through the slot 33, and when the pedal 10 is locked in clutch-out position, said slot is tightly closed by the member 16 and its flange 18. It is thus an impossibility to effect release of the clutch pedal without such operations as to attract serious attention which would thwart the attempted theft.

When the bolt 25 is projected to lock the clutch pedal 10, it passes through the opening 17 of the member 16 carried by the clutch pedal extension. Preferably, the outer end of the bolt is then received in a keeper 39 fixedly mounted in the cover 31, the bolt being thus held against canting and injury, even if excessive force be applied to the clutch pedal 10 in an endeavor to free it from the locking means.

With the pedal 10 locked in clutch-out position, there is insufficient clearance between the bolt-engaging member 16 and the wall of the slot 33, to allow said pedal to be laterally shifted from its fulcrum stud 11, and the clutch thus engaged.

Excellent results have been obtained from the general construction shown and described, and such construction may therefore be considered as preferred. However, within the scope of the invention as claimed, variations may, of course, be made, and the present disclosure is therefore to be considered as illustrative rather than limiting.

I claim:

1. An automobile clutch pedal locking means comprising an extension joined to the clutch pedal, a fixed casing having a normally unoccupied opening to receive said extension when the pedal is in clutch-out position, and lock-controlled means in said casing for locking said extension against undesired withdrawal from said opening.

2. An automobile clutch pedal locking means comprising an extension joined to the clutch pedal, a fixed casing having a normally unoccupied opening to receive said extension when the pedal is in clutch-out position, said casing having a cover for giving access to its interior, securing means for said cover accessible for release only through said opening when the latter is unoccupied, and lock-controlled means for locking said extension against undesired withdrawal from said opening.

3. An automobile clutch pedal locking means comprising an extension joined to the clutch pedal, a casing having a normally unoccupied opening to receive said extension when the pedal is in clutch-out position, said casing having a cover, securing means for said casing readily releasable only from the interior of the same, securing means for said cover accessible for release only through said opening when the latter is unoccupied, and lock-controlled means in said casing for locking said extension against undesired withdrawal from said opening.

4. A structure as specified in claim 1; said extension being provided with a closure to close said opening when the pedal is locked in said clutch-out position.

5. A structure as specified in claim 3; said extension being provided with a closure to close said opening when the pedal is locked in said clutch-out position.

6. In a clutch pedal locking means, a pedal having a fulcrum and an arm projecting downwardly beyond said fulcrum, a second arm integral with and projecting laterally from the lower end of the first named arm, and an upstanding lock-engaging member integral with said lateral arm.

7. In a lock, a casing having a normally unoccupied opening to receive a member to be locked, a cover for giving access to the interior of said casing, securing means for said casing readily releasable only from the interior of the same, and securing means for said cover accessible for release only through said opening when the latter is unoccupied.

8. In a lock, a casing having an open longitudinal side, a bolt guide secured in said casing and extending transversely of said casing between the ends of the same, a lock-controlled bolt slidable in said guide for movement beyond the open side of said casing, a cover abutting said casing and having an open side disposed toward said open side of the casing, said cover having a normally unoccupied entrance slot for the reception of a member to be locked by said bolt, a keeper for the outer end of said bolt secured in said cover, and securing means tying said cover and casing together, said securing means being located between said bolt guide and the casing ends and being accessible for release through said opening when the latter is unoccupied.

9. In a clutch pedal locking means, a pedal having a fulcrum, and an extension integral with said pedal, said extension having an integral lock-engaging portion lying in a plane at right angles to the axis of said fulcrum.

10. In a lock, a casing having a normally unoccupied opening to receive a member to be locked, a cover for giving access to the interior of said casing, and a turn-buckle carried partly by the casing body and partly by said cover for securing the latter, said turn-buckle having a wrench-engaging releasing portion accessible only through said opening when the latter is unoccupied.

DAVID L. SPERO.